(12) United States Patent
Huang

(10) Patent No.: US 8,369,080 B2
(45) Date of Patent: Feb. 5, 2013

(54) REMOVABLE HARD DISK DRIVE BAY

(76) Inventor: Jui-Shu Huang, Daxi Township, Taoyuan County (TW)

( * ) Notice: Subject to any disclaimer, the term of this patent is extended or adjusted under 35 U.S.C. 154(b) by 174 days.

(21) Appl. No.: 13/035,192

(22) Filed: Feb. 25, 2011

(65) Prior Publication Data
US 2012/0218705 A1    Aug. 30, 2012

(51) Int. Cl.
*G06F 1/16* (2006.01)
*H05K 5/00* (2006.01)
*H05K 7/00* (2006.01)

(52) U.S. Cl. .......... 361/679.38; 361/679.37; 361/679.58

(58) Field of Classification Search ............ 361/679.33–679.45, 679.58
See application file for complete search history.

(56) References Cited

U.S. PATENT DOCUMENTS

| | | | |
|---|---|---|---|
| 3,193,342 A * | 7/1965 | Sauter | 312/332.1 |
| 5,518,412 A * | 5/1996 | Larabell | 439/157 |
| 5,784,644 A * | 7/1998 | Larabell | 710/9 |
| 6,008,984 A * | 12/1999 | Cunningham et al. | 361/679.31 |
| 6,042,401 A * | 3/2000 | Oguchi et al. | 439/159 |
| 6,058,016 A * | 5/2000 | Anderson et al. | 361/727 |
| 6,067,225 A * | 5/2000 | Reznikov et al. | 361/679.31 |
| 6,186,804 B1 * | 2/2001 | Smith et al. | 439/157 |
| 6,193,339 B1 * | 2/2001 | Behl et al. | 312/223.2 |
| 6,210,188 B1 * | 4/2001 | Chang | 439/159 |
| 6,356,441 B1 * | 3/2002 | Claprood | 361/679.33 |
| 6,378,965 B1 * | 4/2002 | Reznikov et al. | 312/332.1 |
| 6,490,153 B1 * | 12/2002 | Casebolt et al. | 361/679.33 |
| 6,560,098 B1 * | 5/2003 | Beinor et al. | 361/679.39 |
| 6,587,350 B1 * | 7/2003 | Lin et al. | 361/754 |
| 6,637,846 B2 * | 10/2003 | Yang | 312/223.2 |
| 6,643,139 B2 * | 11/2003 | Tien | 361/727 |
| 6,661,651 B1 * | 12/2003 | Tanzer et al. | 361/679.33 |
| 6,798,650 B2 * | 9/2004 | Reznikov et al. | 361/679.33 |
| 6,921,282 B2 * | 7/2005 | Chiou et al. | 439/483 |
| 6,927,973 B2 * | 8/2005 | Song et al. | 361/679.33 |
| 6,952,341 B2 * | 10/2005 | Hidaka et al. | 361/679.32 |
| 6,978,903 B2 * | 12/2005 | Son et al. | 211/26 |
| 6,991,480 B2 * | 1/2006 | Katayanagi et al. | 439/159 |
| 7,040,908 B2 * | 5/2006 | Kamata | 439/159 |
| 7,050,297 B2 * | 5/2006 | Chung | 361/679.35 |
| 7,072,177 B2 * | 7/2006 | Peng et al. | 361/679.33 |
| 7,477,511 B2 * | 1/2009 | Hsu et al. | 361/679.37 |
| 7,511,953 B2 * | 3/2009 | Tao et al. | 361/679.39 |
| 7,782,606 B2 * | 8/2010 | Baker et al. | 361/679.39 |
| 7,848,099 B1 * | 12/2010 | Zhang et al. | 361/679.38 |
| 7,864,522 B1 * | 1/2011 | Peng et al. | 361/679.33 |
| 7,924,557 B2 * | 4/2011 | Li | 361/679.37 |
| 7,974,088 B2 * | 7/2011 | Li | 361/679.37 |
| 8,023,263 B2 * | 9/2011 | Crippen et al. | 361/679.58 |
| 8,045,326 B1 * | 10/2011 | Reznikov | 361/679.38 |
| 8,087,739 B2 * | 1/2012 | Chen | 312/332.1 |
| 8,130,490 B2 * | 3/2012 | Jiang et al. | 361/679.33 |
| 8,243,435 B2 * | 8/2012 | Li | 361/679.37 |

(Continued)

*Primary Examiner* — Adrian S Wilson
(74) *Attorney, Agent, or Firm* — patenttm.us

(57) ABSTRACT

A removable hard disk drive (HDD) bay has a casing, a door assembly and an extracting assembly. The door assembly has a pivoting member, a cover slidably mounted on the pivoting member, a retainer slidably mounted in the cover and selectively hooking the casing, and a driving member driving the retainer. The extracting assembly pivotally connects the door assembly to the casing. When the door assembly is opened relative to the casing, the extracting assembly extracts the HDD (AA) with a simple mechanism and the door assembly does not occupy any room in the casing. The casing does not have to reserve a room for the door assembly and a volume of the removable HDD bay is efficiently minimized.

14 Claims, 9 Drawing Sheets

U.S. PATENT DOCUMENTS

| | | | |
|---|---|---|---|
| 8,246,129 B2 * | 8/2012 | Wang et al. ............... | 312/332.1 |
| 2002/0071248 A1 * | 6/2002 | Huang et al. ................ | 361/685 |
| 2002/0101708 A1 * | 8/2002 | Cheng ........................ | 361/685 |
| 2004/0190266 A1 * | 9/2004 | Chung ........................ | 361/724 |
| 2005/0111180 A1 * | 5/2005 | Song .......................... | 361/685 |
| 2005/0207108 A1 * | 9/2005 | Chen .......................... | 361/685 |
| 2007/0019379 A1 * | 1/2007 | Hsiao ......................... | 361/685 |
| 2007/0211422 A1 * | 9/2007 | Liu et al. .................... | 361/685 |
| 2007/0230107 A1 * | 10/2007 | Hsu et al. ................... | 361/685 |
| 2008/0030946 A1 * | 2/2008 | Lee ............................. | 361/685 |
| 2008/0055841 A1 * | 3/2008 | Tao et al. .................... | 361/685 |
| 2008/0112126 A1 * | 5/2008 | Hsu ............................. | 361/685 |
| 2008/0204994 A1 * | 8/2008 | Wang .......................... | 361/685 |
| 2008/0266781 A1 * | 10/2008 | Olesiewicz et al. .......... | 361/685 |
| 2008/0316684 A1 * | 12/2008 | Kilpinen ..................... | 361/679 |
| 2009/0279249 A1 * | 11/2009 | Crippen et al. ............. | 361/679.58 |
| 2010/0321879 A1 * | 12/2010 | Peng et al. .................. | 361/679.33 |
| 2011/0304960 A1 * | 12/2011 | Lu .............................. | 361/679.01 |

* cited by examiner

REMOVABLE HARD DISK DRIVE BAY

BACKGROUND OF THE INVENTION

1. Field of the Invention

The present invention relates to a removable hard disk drive bay, especially to a hard disk drive bay that has a door assembly, which does not occupy any room of a casing when opened, and a simplified extracting assembly.

2. Description of the Prior Art(s)

Compared with a flash memory or an optical disc, a hard disk drive (HDD) has larger storage capacity and higher durability and reliability, and therefore has been a dominant data storage device in general-purpose computers in recent years. For the convenience of drawing the HDD from a computer case, the HDD is stored in a removable HDD bay and is mounted in the computer case along with the removable HDD bay.

With reference to FIG. 9, a conventional removable HDD bay comprises a casing 71, a frame 72 and a door 73. The casing 71 has an open end. The frame 72 is mounted around the open end of the casing 71 and has an opening 721 formed through the frame 72 and communicating with the open end of the casing 72. An HDD is mounted through the through hole 721 of the frame 72 and is stored in the casing 71. The door 73 is disposed in the opening 721 of the frame 72, is pivotally mounted on the frame 72 and selectively hooks to the frame 72 to close the opening 721 of the frame 72 and to prevent the HDD from dropping out of the conventional removable HDD bay.

However, since the door 73 has a thickness, is pivotally disposed in the opening 721 of the frame 72 and occupies a room in the opening 721 of the frame 72 when the door 73 is opened, widths of the opening 721 and the frame 72 are larger than the open end of the casing 71. Thus, when the door 73 is opened, a remaining width of the opening 721 is sufficient for the HDD to go through the opening 721 of the frame 72.

Furthermore, an extracting mechanism with multiple extracting elements is further mounted on the casing 71 and is connected to the door 73. When the door 73 is opened, the door 73 also drives the extracting elements to push the HDD out of the conventional removable HDD bay. However, the extracting mechanism of the conventional removable HDD bay is disposed on and along a sidewall of the casing 71 and also occupies a room in the casing 71.

Therefore, the conventional removable HDD bay occupies a far larger room in the computer case than a volume of the HDD. Therefore, the conventional removable HDD bay is bulky and is not suitable for a small-sized computer case.

To overcome the shortcomings, the present invention provides a removable hard disk drive bay to mitigate or obviate the aforementioned problems.

SUMMARY OF THE INVENTION

The main objective of the present invention is to provide a removable hard disk drive (HDD) bay.

The removable HDD bay has a casing, a door assembly and an extracting assembly. The door assembly has a pivoting member, a cover slidably mounted on the pivoting member, a retainer slidably mounted in the cover and selectively hooking the casing, and a driving member driving the retainer. The extracting assembly pivotally connects the door assembly to the casing.

When the door assembly is opened relative to the casing, the extracting assembly extracts the HDD with a simple mechanism and the door assembly does not occupy any room in the casing. The casing does not have to reserve a room for the door assembly and a volume of the removable HDD bay is efficiently minimized.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
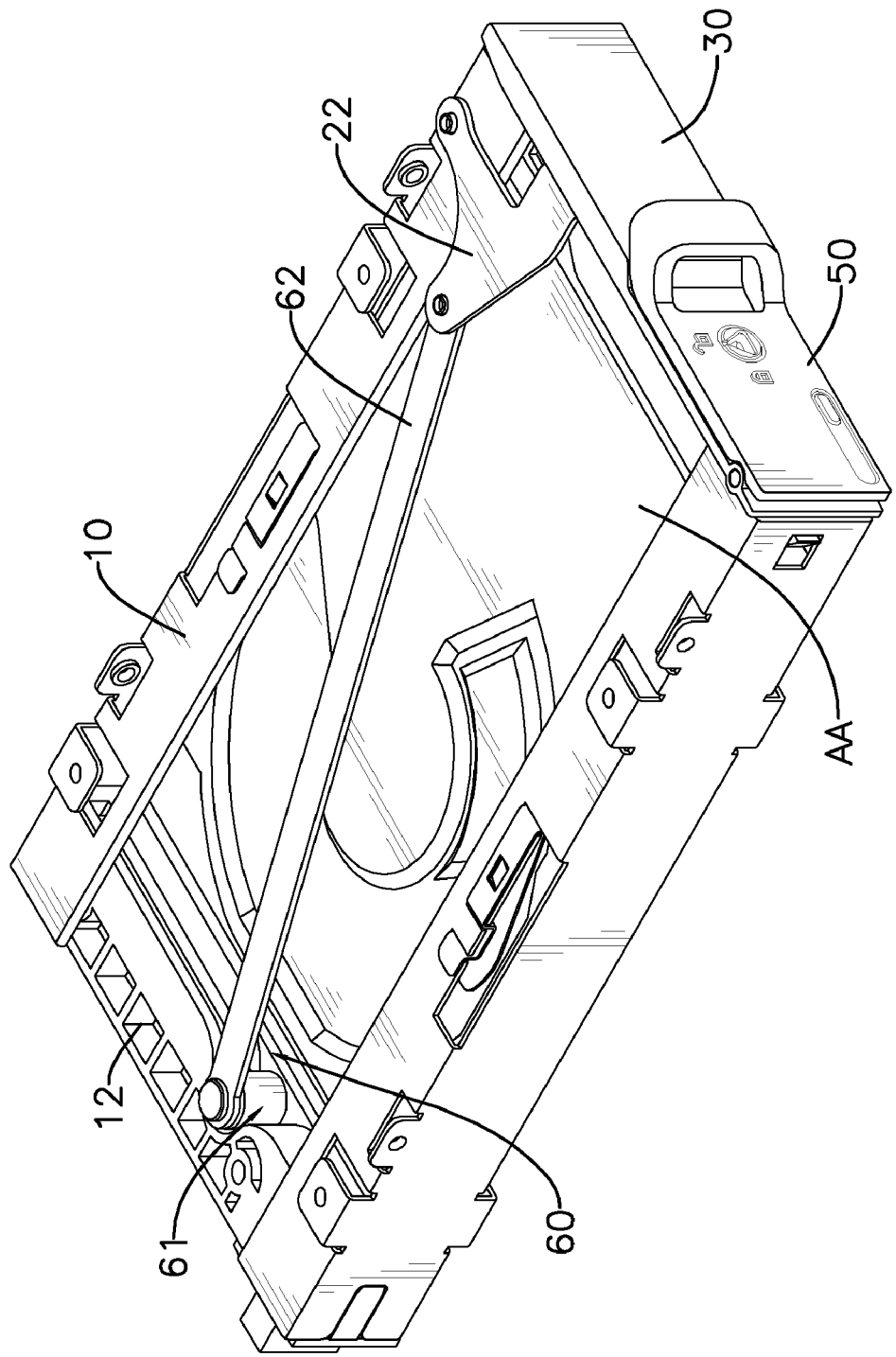
FIG. 1 is a perspective view of a removable hard disk drive (HDD) bay in accordance with the present invention, showing an HDD mounted in the removable HDD bay.

With reference to FIG. 1, a removable hard disk drive (HDD) bay in accordance with the present invention comprises a casing 10, a door assembly and an extracting assembly 60.

Figure 2:
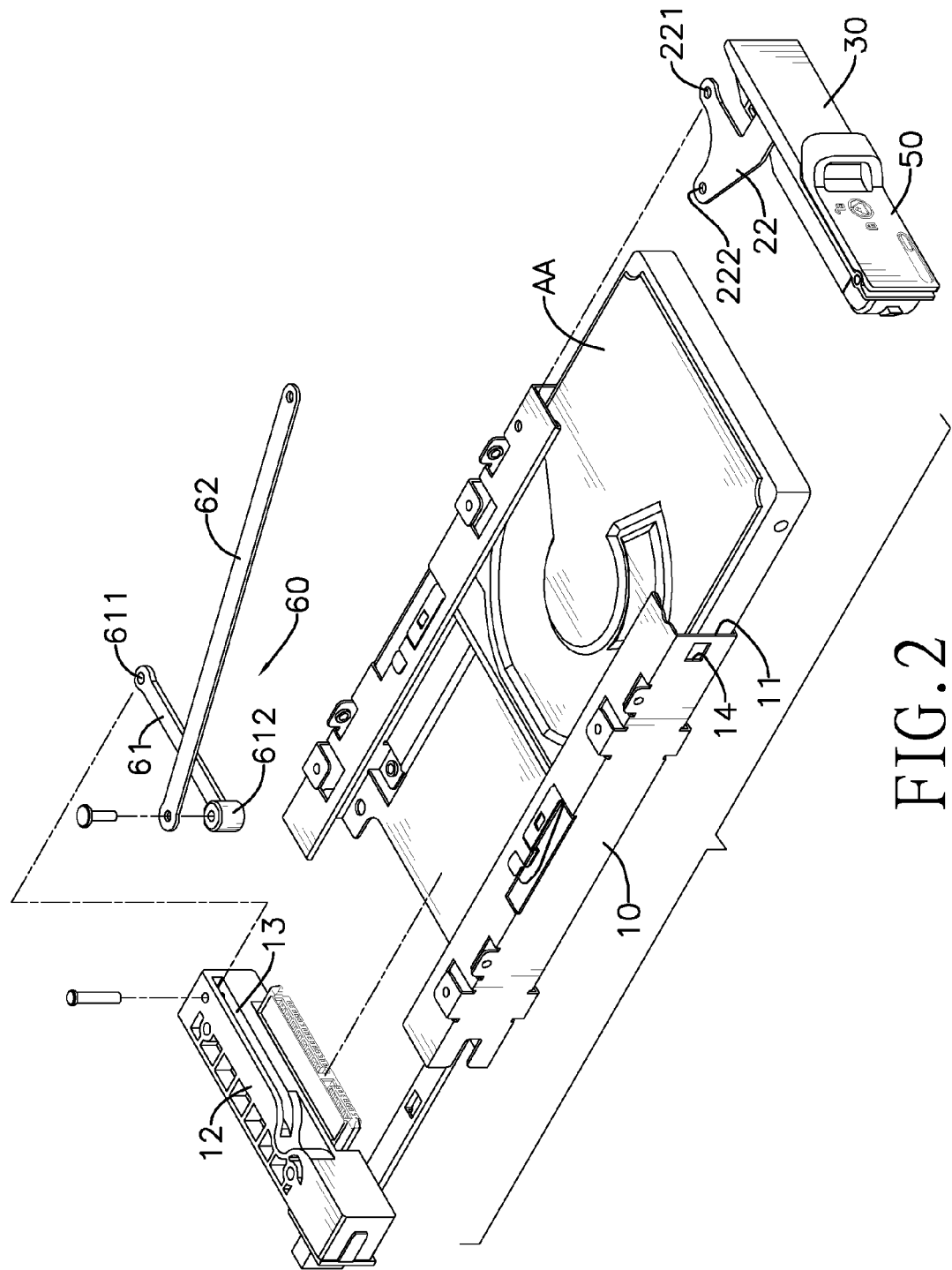
FIG. 2 is an exploded perspective view of the removable HDD bay in FIG. 1.

With further reference to FIG. 2, the casing 10 receives an HDD AA and has an open end 11, a closed end 12, a rear inner surface, a sidewall, a receiving recess 13 and a hooking hole 14. The rear inner surface of the casing 10 is defined on the closed end 12. The receiving recess 13 is elongated and is transversely formed in the rear inner surface of the casing 10. The hooking hole 14 is formed through the sidewall of the casing 10 and is disposed adjacent to the open end 11 of the casing 10.

Figure 3:
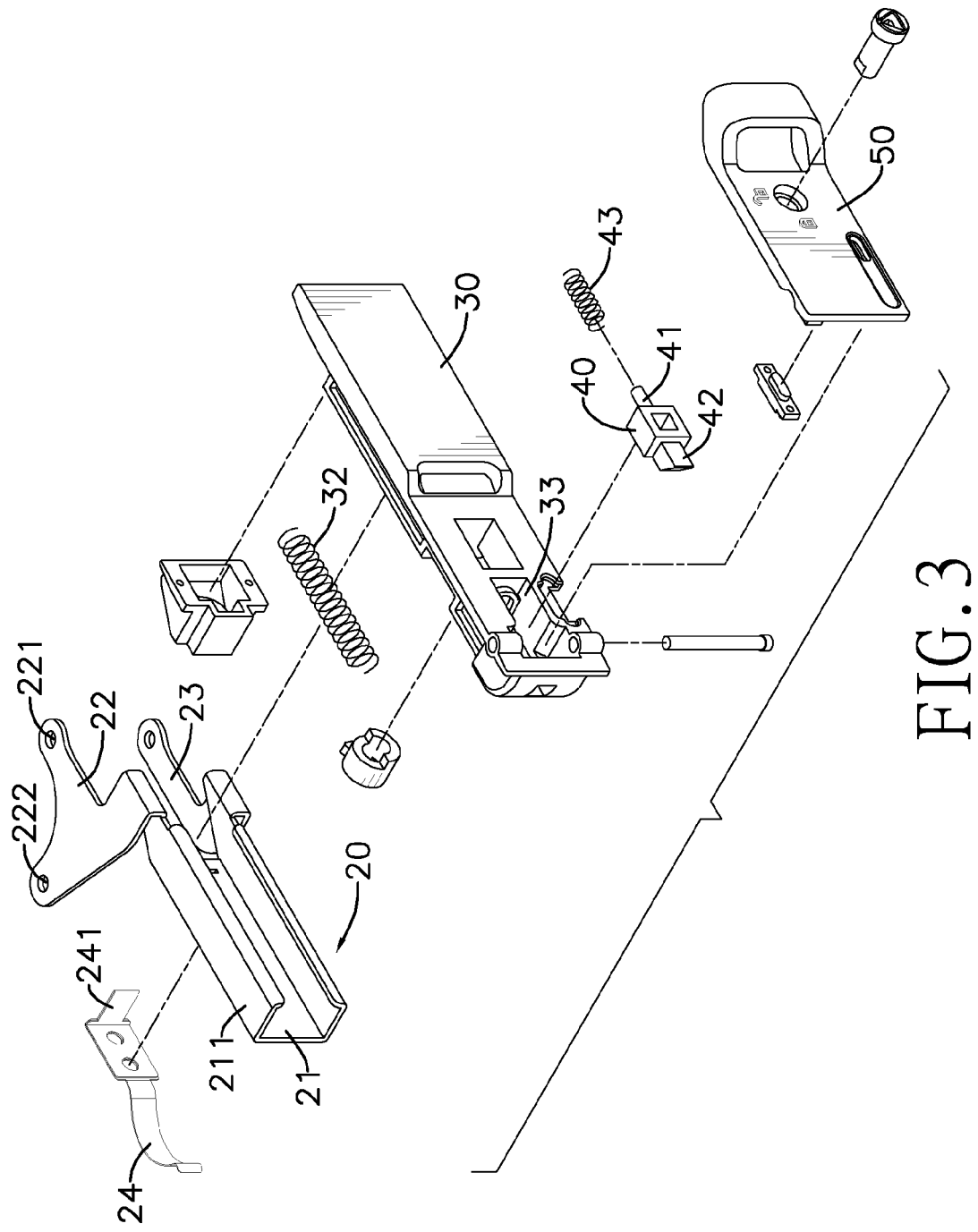
FIG. 3 is an enlarged exploded perspective view of the removable HDD bay in FIG. 1.
Figure 4:
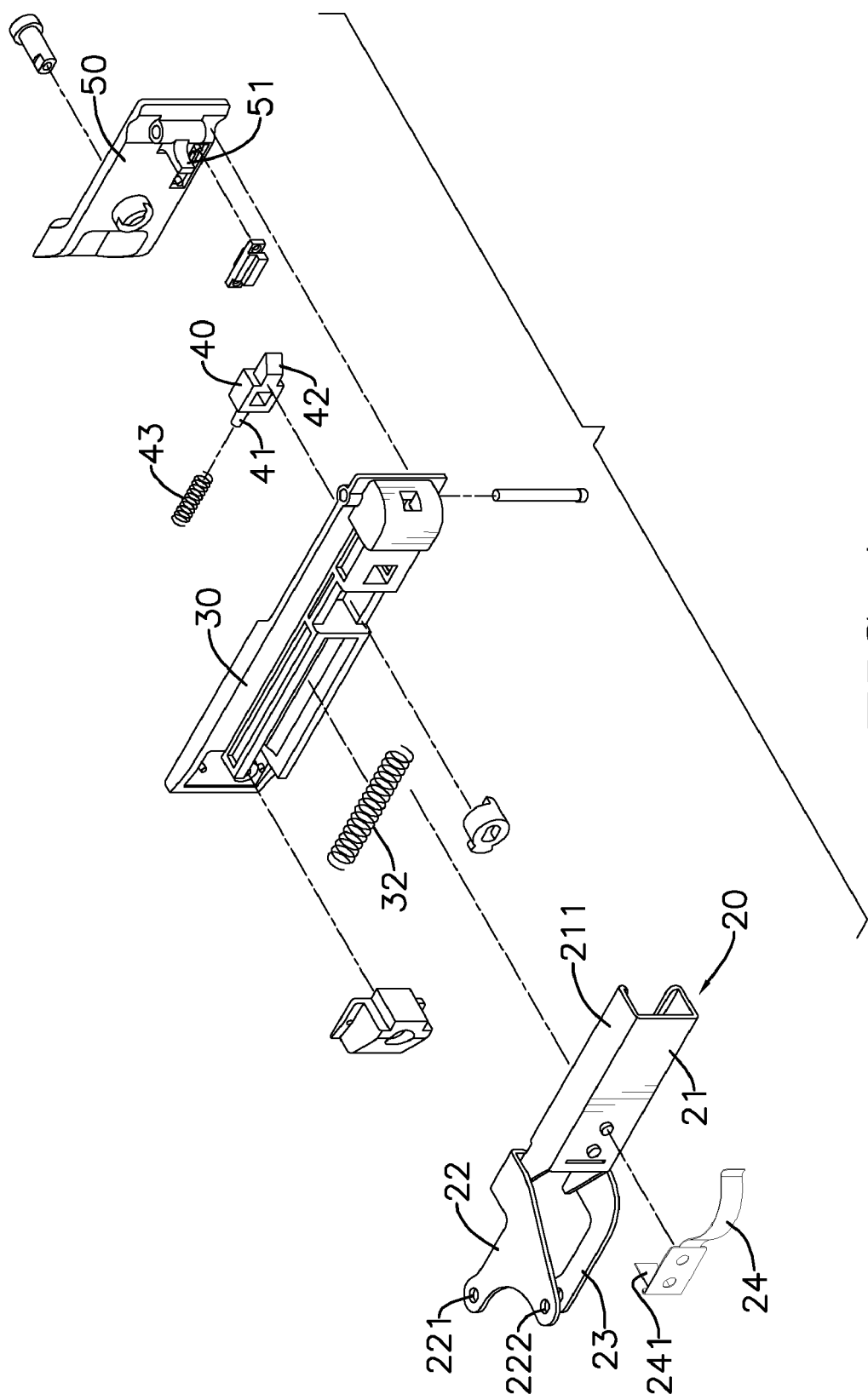
FIG. 4 is another enlarged exploded perspective view of the removable HDD bay in FIG. 1.

With further reference to FIGS. 3 and 4, the door assembly is pivotally mounted on the open end 11 of the casing 10 and has a pivoting member 20, a cover 30, a retainer 40 and a driving member 50.

The pivoting member 20 is pivotally mounted on the open end 11 of the casing 10, is about half a length of the open end 11 of the casing 10 and has a sliding bracket 21, a first pivoting panel 22, a second pivoting panel 23 and a spring plate 24. The sliding bracket 21 is U-shaped in cross-section and has an outer surface, a pivoting end and two opposite sidewalls 211. The outer surface of the sliding bracket 21 corresponds to the open end 11 of the casing 10. The first pivoting panel 22 is disposed at the pivoting end of the sliding bracket 21, is pivotally connected to the casing 10, is Y-shaped and has a proximal end, a distal pivoting end 221 and a distal connecting end 222. The proximal end of the first pivoting panel 22 is bent and is attached to one sidewall 211 of the sliding bracket 21 to form a channel between the first pivoting panel 22 and a corresponding sidewall 211 of the sliding bracket 21. The distal pivoting end 221 of the first pivoting panel 22 is pivotally connected to the casing 10. The second pivoting panel 23 is disposed at the pivoting end of the sliding bracket 21, is L-shaped, is pivotally connected to the casing 10 and has a proximal end. The proximal end of the second pivoting panel 23 is bent and is attached to the other sidewall 211 of the sliding bracket 21 to form a channel between the second pivoting panel 23 and a corresponding sidewall 211 of the sliding bracket 21. Thus, when the pivoting member 20 pivots toward the casing 10, a top panel and a bottom panel of the casing 10 are respectively received between the first and second pivoting panels 22, 23 and sidewalls 211 of the sliding bracket 21. The spring plate 24 is mounted on the outer surface of the sliding bracket 21 and has a stop 241. The stop 241 of the spring plate 24 is mounted through the sliding bracket 21.

The cover 30 is slidably mounted on the sliding bracket 21 of the pivoting member 20, corresponds to and selectively covers the open end 11 of the casing 10, and has an interior recess 31, a first resilient element 32 and exterior recess 33. The interior recess 31 is formed in an inner surface of the cover 40 and corresponds to the sliding bracket 23 of the pivoting member 20. The first resilient element 32 is mounted in the interior recess 31 of the cover 30 and has two ends. The ends of the first resilient element 32 respectively abut the pivoting member 20 and the cover 30 and respectively abut the stop 241 of the spring plate 24 of the pivoting member 20 and the cover 30. The exterior recess 33 is formed in an outer surface of the cover 30.

The retainer 40 is slidably mounted in the exterior recess 33 of the cover 30 and has two opposite ends, a mounting rod 41, a locking rod 42 and a second resilient element 43. The mounting rod 41 protrudes from one end of the retainer 40. The locking rod 42 protrudes from the other end of the retainer 40, is mounted through the cover 30 and is selectively hooked in the hooking hole 14 of the casing 10. The second resilient element 43 is mounted around the mounting rod 41 and has two ends respectively abutting the retainer 40 and the cover 30. When the cover 30 covers the open end 11 of the casing 10, the locking rod 42 is further hooked in the hooking hole 14 of the casing 10 and the cover 30 is securely attached to the casing 10.

The driving member 50 is pivotally mounted on the outer surface of the cover 30, corresponds to the exterior recess 33 of the cover 30 and has a driving rod 51. The driving rod 51 is formed on an inner surface of the driving member 50 and is mounted through the retainer 40. When the driving member 50 pivots, the driving rod 51 pushes the retainer 40 to slide and to press the second resilient element 43 of the retainer 40.

Figure 7:
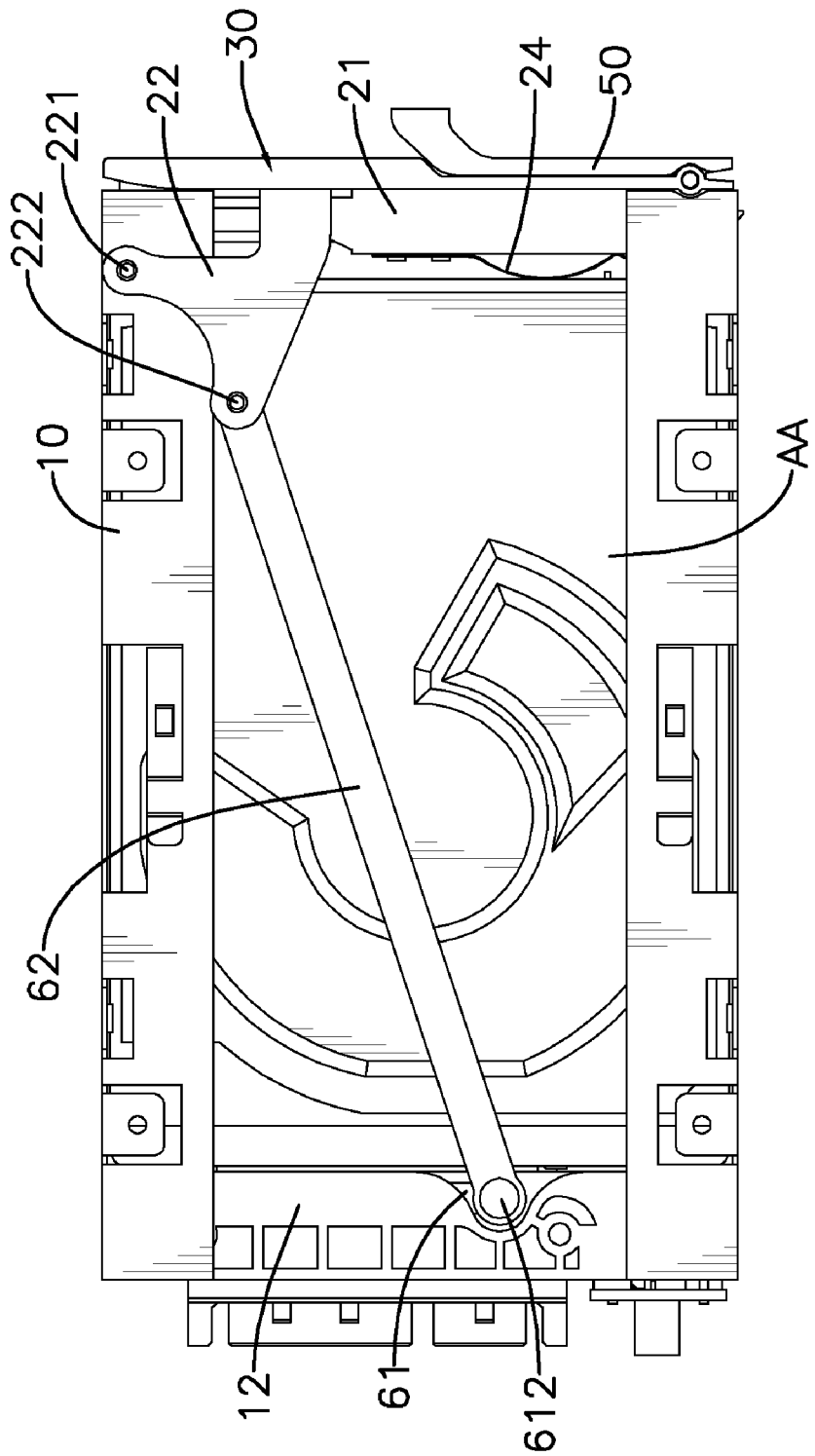
FIG. 7 is a top view of the removable HDD bay in FIG. 1.

With further reference to FIGS. 2 and 7, the extracting assembly 60 is pivotally mounted on the casing 10, is driven by the pivoting member 20 of the door assembly and has a swing lever 61 and a transmission lever 62. The swing lever 61 is pivotally mounted on the closed end 12 of the casing 10, is selectively received in the receiving recess 13 of the casing 10 and has a pivoting end 611 and a swing end 612. The pivoting end 611 of the swing lever 61 is disposed in the receiving recess 13 of the casing 10 and is pivotally connected to the closed end 12 of the casing 10. The swing end 612 of the swing lever 61 abuts the HDD AA that is received in the casing 10. The transmission lever 62 has two ends respectively connected pivotally to the distal connecting end 222 of the first pivoting panel 22 and the swing end 612 of the swing lever 61.

Figure 5:
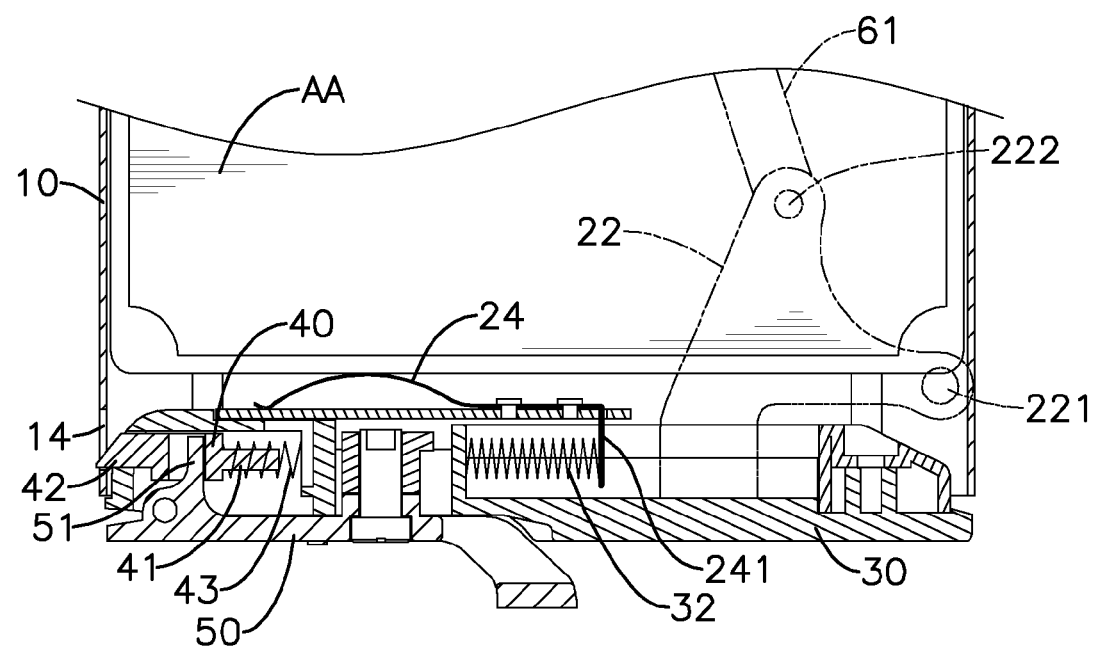
FIG. 5 is an enlarged top view in partial section of the removable HDD bay in FIG. 1.

With reference to FIG. 5, when the door assembly is closed relative to the casing 10 to hold the HDD AA in the casing 10, the first resilient element 32 is pressed by the cover 30 and the second resilient element 43 pushes the retainer 40 to allow the locking rod 42 of the retainer 40 to engage the hooking hole 14 of the casing 10. Moreover, with further reference to FIG. 7, the swing lever 61 is received in the receiving recess 13 of the casing 10.

Figure 6:
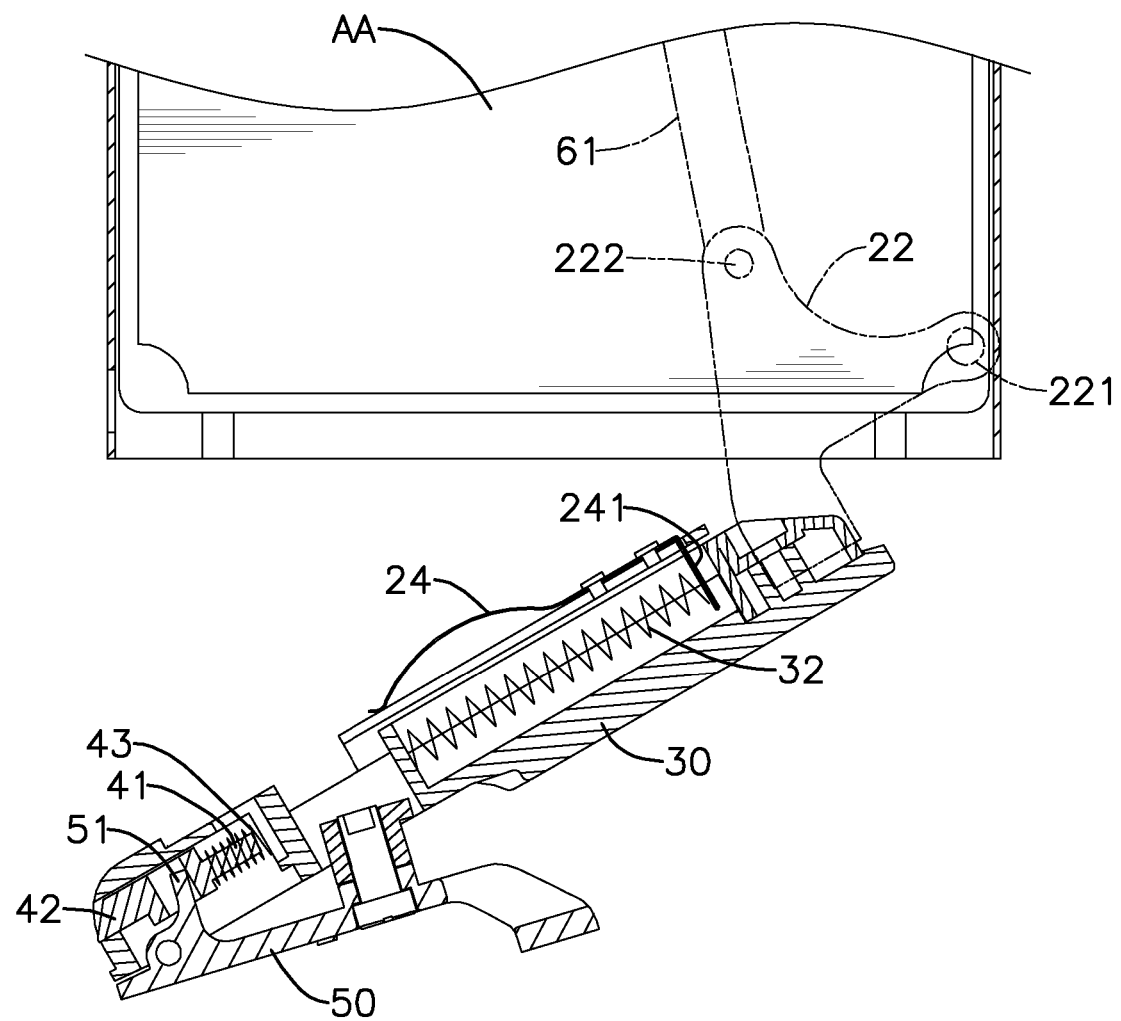
FIG. 6 is an enlarged operational top view in partial section of the removable HDD bay in FIG. 1.

With further reference to FIG. 6, when the driving member 50 is pivoted, the driving member 50 drives the retainer 40 to press the second resilient element 43 and to allow the locking rod 42 of the retainer 40 to disengage from the hooking hole 14 of the casing 10. Then, the door assembly is opened relative to the casing 10.

Figure 8:
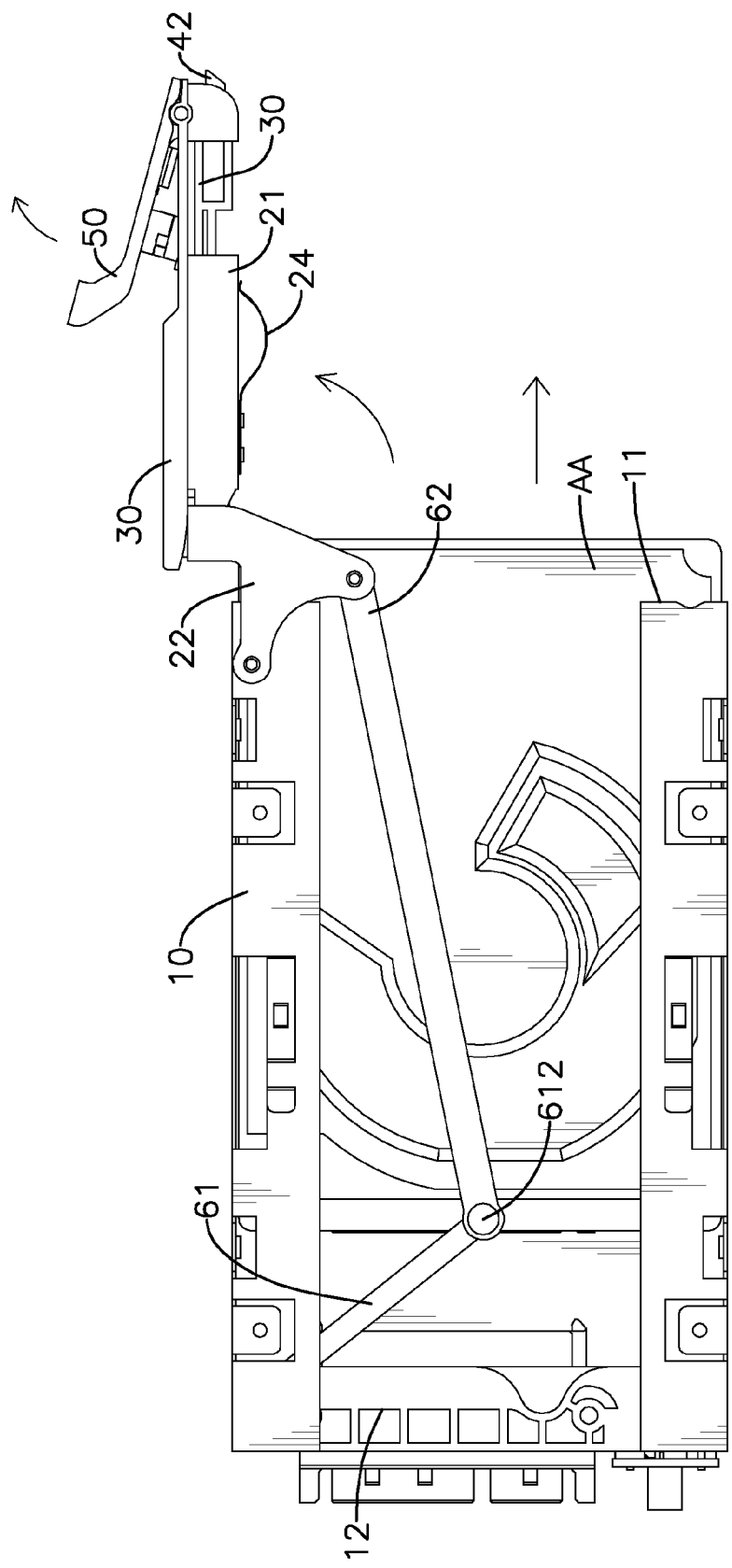
FIG. 8 is an operational top view of the removable HDD bay in FIG. 1.
Figure 9:
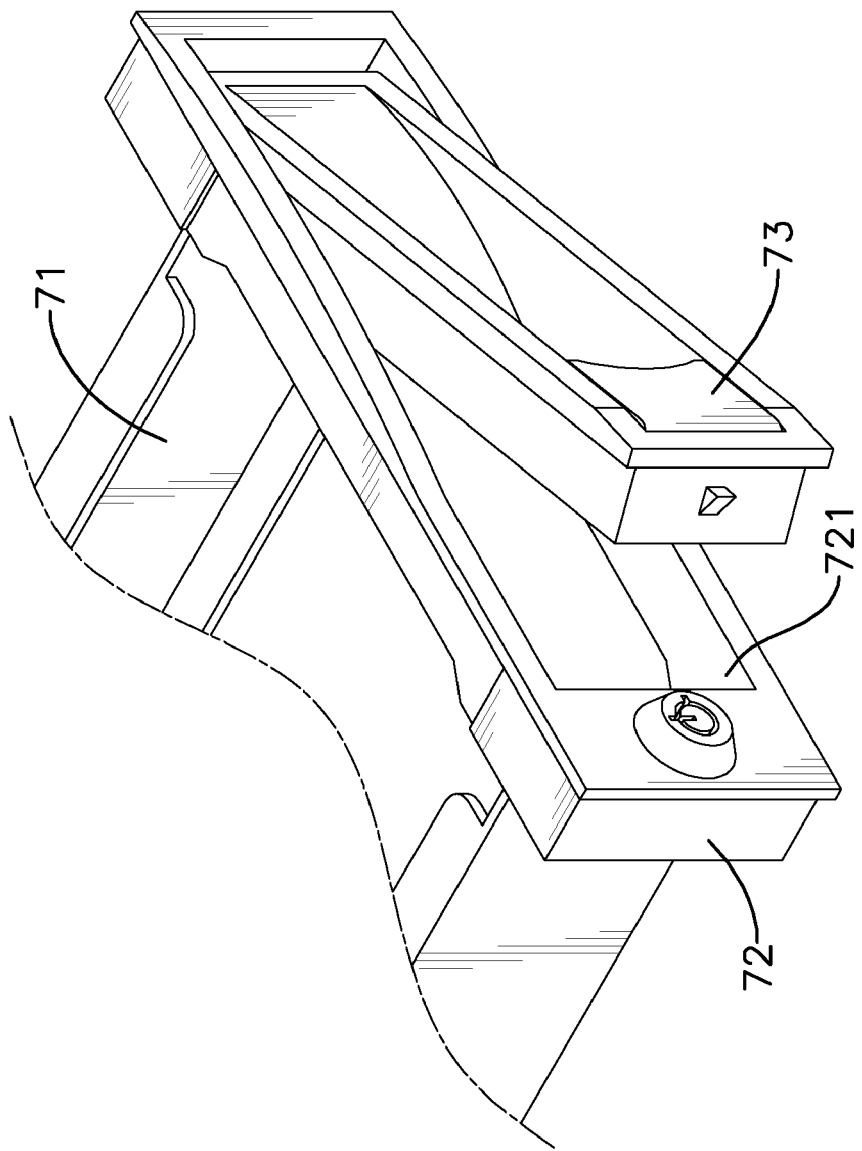
FIG. 9 is an enlarged perspective view of a conventional removable HDD bay in accordance with the prior art.

With further reference to FIG. 8, as the door assembly is opened relative to the open end 11 of the casing 10, the first pivoting panel 22 of the pivoting member 20 pulls the transmission lever 62, and consequently, the swing lever 61 pivots to depart from the receiving recess 13 of the casing 10 and pushes the HDD AA out of the casing 10.

The removable HDD bay as described has the following advantages. When the door assembly is opened relative to the casing 10, the door assembly does not occupy any room in the open end 11 of the casing 10. Furthermore, the extracting assembly 60 extracts the HDD AA with a simple mechanism also without occupying any room of the casing 10. Thus, the casing 10 does not have to reserve a room for the door assembly and a volume of the removable HDD bay is efficiently minimized.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A removable hard disk drive (HDD) bay comprising
   a casing having
      an open end;
      a sidewall; and
      a hooking hole formed through the sidewall of the casing and disposed adjacent to the open end of the casing; and
   a door assembly pivotally mounted on the open end of the casing and having
      a pivoting member pivotally mounted on the open end of the casing and having
         a sliding bracket being U-shaped in cross-section and having a pivoting end; and
         a first pivoting panel disposed at the pivoting end of the sliding bracket, pivotally connected to the casing and has a proximal end bent and attached to the sliding bracket to form a channel between the first pivoting panel and the sliding bracket;
      a cover slidably mounted on the pivoting member and having an exterior recess formed in an outer surface of the cover;
      a retainer slidably mounted in the exterior recess of the cover and having
         two opposite ends;
         a mounting rod protruding from one end of the retainer;
         a locking rod protruding from the other end of the retainer, mounted through the cover and selectively hooked in the hooking hole of the casing; and
         a second resilient element mounted around the mounting rod and having two ends respectively abutting the retainer and the cover; and a driving member pivotally mounted on the outer surface of the cover, corresponding to the exterior recess of the cover and having a driving rod formed on an inner surface of the driving member and mounted through the retainer.

2. The removable HDD bay as claimed in claim 1, wherein the cover further has
an interior recess formed in an inner surface of the cover and corresponding to the sliding bracket of the pivoting member; and
a first resilient element mounted in the interior recess of the cover and has two ends respectively abutting the pivoting member and the cover.

3. The removable HDD bay as claimed in claim 1, wherein the casing further has a closed end; and
the removable HDD bay further has an extracting assembly pivotally mounted on the casing, driven by the pivoting member of the door assembly and having
a swing lever pivotally mounted on the closed end of the casing and having
a pivoting end pivotally connected to the closed end of the casing; and
a swing end; and
a transmission lever having two ends respectively connected pivotally to the first pivoting panel and the swing end of the swing lever.

4. The removable HDD bay as claimed in claim 2, wherein the casing further has a closed end; and
the removable HDD bay further has an extracting assembly pivotally mounted on the casing, driven by the pivoting member of the door assembly and having
a swing lever pivotally mounted on the closed end of the casing and having
a pivoting end pivotally connected to the closed end of the casing; and
a swing end; and
a transmission lever having two ends respectively connected pivotally to the first pivoting panel and the swing end of the swing lever.

5. The removable HDD bay as claimed in claim 3, wherein the casing further has
a rear inner surface defined on the closed end of the casing; and
a receiving recess being elongated and transversely formed in the rear inner surface of the casing;
the swing lever of the extracting assembly is selectively received in the receiving recess of the casing; and
the pivoting end of the swing lever is disposed in the receiving recess of the casing.

6. The removable HDD bay as claimed in claim 4, wherein the casing further has
a rear inner surface defined on the closed end of the casing; and
a receiving recess being elongated and transversely formed in the rear inner surface of the casing;
the swing lever of the extracting assembly is selectively received in the receiving recess of the casing; and
the pivoting end of the swing lever is disposed in the receiving recess of the casing.

7. The removable HDD bay as claimed in claim 5, wherein the sliding bracket of the pivoting member has an outer surface corresponding to the open end of the casing; and
the pivoting member further has a spring plate mounted on the outer surface of the sliding bracket.

8. The removable HDD bay as claimed in claim 6, wherein the sliding bracket of the pivoting member has an outer surface corresponding to the open end of the casing; and
the pivoting member further has a spring plate mounted on the outer surface of the sliding bracket.

9. The removable HDD bay as claimed in claim 7, wherein the sliding bracket of the pivoting member has two opposite sidewalls;
the proximal end of the first pivoting panel of the pivoting member is attached to one sidewall of the sliding bracket to form the channel between the first pivoting panel and a corresponding sidewall of the sliding bracket; and
the pivoting member further has a second pivoting panel disposed at the pivoting end of the sliding bracket, pivotally connected to the casing and has a proximal end bent and attached to the other sidewall of the sliding bracket to form a channel between the second pivoting panel and a corresponding sidewall of the sliding bracket.

10. The removable HDD bay as claimed in claim 7, wherein
the sliding bracket of the pivoting member has two opposite sidewalls;
the proximal end of the first pivoting panel of the pivoting member is attached to one sidewall of the sliding bracket to form the channel between the first pivoting panel and a corresponding sidewall of the sliding bracket; and
the pivoting member further has a second pivoting panel disposed at the pivoting end of the sliding bracket, pivotally connected to the casing and has a proximal end bent and attached to the other sidewall of the sliding bracket to form a channel between the second pivoting panel and a corresponding sidewall of the sliding bracket.

11. The removable HDD bay as claimed in claim 9, wherein
the first pivoting panel of the pivoting member is Y-shaped and has
a distal pivoting end pivotally connected to the casing; and
a distal connecting end; and
the ends of the transmission lever are respectively connected pivotally to the distal connecting end of the first pivoting panel and the swing end of the swing lever.

12. The removable HDD bay as claimed in claim 10, wherein
the first pivoting panel of the pivoting member is Y-shaped and has
a distal pivoting end pivotally connected to the casing; and
a distal connecting end; and
the ends of the transmission lever are respectively connected pivotally to the distal connecting end of the first pivoting panel and the swing end of the swing lever.

13. The removable HDD bay as claimed in claim 11, wherein
the pivoting member is half a length of the open end of the casing; and
the cover corresponds to the open end of the casing.

14. The removable HDD bay as claimed in claim 12, wherein
the pivoting member is half a length of the open end of the casing; and
the cover corresponds to the open end of the casing.

* * * * *